United States Patent Office 3,133,816
Patented May 19, 1964

3,133,816
PHOTOGRAPHIC COATING FORMULATION
Aaron Ben-Ezra, Binghamton, N.Y., assignor to General Aniline & Film Corporation, New York, N.Y., a corporation of Delaware
No Drawing. Filed July 15, 1960, Ser. No. 43,003
18 Claims. (Cl. 96—94)

This invention relates to photography and, more particularly, to a new class of coating aids or wetting agents useful in coating and washing photographic material such as film or paper.

The use of wetting agents in the coating of photographic materials is well known. A number of such wetting agents have been recommended and used in conjunction with emulsions, dye washes, rinses, non-curling (NC) layers and antihalation layers. These wetting agents include saponin which is derived from vegetable sources and a considerable number of synthetic surfactants of the anionic, cationic and non-ionic type. These known surfactants have been found not to be entirely satisfactory because of the formation of repellency spots, mottle, streakiness and/or air bells in the coating. Especially harmful is the formation of air bells which are not present in the original film but appear only during or after development.

It is an object of this invention to provide a surfactant for use in photography that is free of the drawbacks of the prior art wetting agents.

It is a further object of this invention to provide a wetting agent for use in photography which has superior coating qualities and does not produce air bells in the coating.

Other objects will be apparent from the following description.

The objects and advantages of this invention are accomplished by incorporating in a photographic coating composition an amphoteric surfactant which is a β-alanine derivative and characterized by one of the following formulae:

$$RNHCH_2CH_2COOX$$

and $$RN(CH_2CH_2COOX)_2$$

In these formulae, R represents an aliphatic hydrocarbon chain of from 8 to 20 carbon atoms such as octyl, nonyl, decyl, undecyl, dodecyl, tridecyl, tetradecyl, pentadecyl, hexadecyl, heptadecyl and octadecyl; X represents hydrogen or a cation such as an alkali metal, e.g., sodium, potassium, lithium, ammonium or an organic amine cation such as diethanolamine, triethylamine, triethanolamine, morpholine or piperidine. These compounds are prepared by reacting a primary amine having from 8 to 20 carbon atoms with chloropropionic or bromopropionic acid in the presence of an alkali such as sodium hydroxide or potassium carbonate.

The compounds can also be prepared in accordance with the method described in United States Patent 2,468,012 by condensing at 25–30° C., a primary amine containing from 8 to 20 carbon atoms with methyl acrylate to form the β-alkylaminopropionate. The methyl ester is hydrolyzed to an acid or converted to the alkali or organic amine salts by the conventional method of saponification. The secondary amine is obtained by the use of molar proportions whereas the tertiary amine is obtained by using at least two molar equivalents of the acid derivatives.

In the selection of the amines, it is usually more economical to select those with an even number of hydrocarbon atoms because they are commercially available. The mixtures of amines obtained from coconut, soybeans or tallow may be used with equal success. Compounds which have been found to be particularly useful include the following:

$$C_{12}H_{25}NH.CH_2CH_2COONa$$
Sodium-N-dodecyl-β-aminopropionate $$C_{10}H_{23}NH.CH_2CH_2COOH$$
N-decyl-β-aminopropionic acid $$C_{14}H_{29}NH.CH_2CH.COOK$$
Potassium N-tetradecyl-β-aminopropionate $$C_{16}H_{33}NH.CH_2CH_2COONa$$
Sodium-N-hexadecyl-β-aminopropionate $$C_{18}H_{37}NH.CH_2CH_2COONa$$
Sodium-N-octadecyl-β-aminopropionate

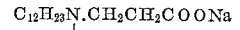
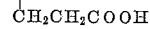

Monosodium salt of N-dodecyl-β-aminodipropionate

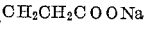
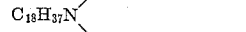
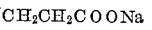

Disodium-N-octadecyl-β-aminodipropionate These compounds have the additional advantage of permitting "wet-on-wet" coatings which means that they have the ability to facilitate the spreading of a colloidal layer over a previously coated emulsion layer which is chilled but still wet, thus eliminating an additional coating pass and an extra drying operation.

The coating compositions in which the novel surfactant may be incorporated may be any of the coating compositions used in the photographic art; for example, those used for the preparation of photographic emulsions, gelatin surface coatings, NC layers, dye washes, rinses, antihalation layers, dyes and antistatic layers.

The wetting agents of this invention may be used in amounts ranging from .02 to 0.5 percent by volume based on the total volume of the coating solution. Based on the amounts of gelatin used, the alanine derivatives used in accordance with my invention are added to the liquid photographic emulsions or other aqueous gelatin dispersions or solutions in proportions ranging from 1 to 40 grams per kilogram of dry gelatin emulsion. Expressed in terms of coated areas, the effective amounts range from 0.1 to 5 milligrams per square foot of coated area.

The process used in coating the solutions containing the novel wetting agent of this invention may be any one of the known processes used in this art; such as, air knife, applicator pan, extrusion or dip pan coating. In the coating operations with the surfactants of this invention, both paper and film supports may be utilized. Suitable film supports include cellulose esters such as cellulose acetate, cellulose propionate, cellulose acetate-butyrate; vinyl esters such as the copolymers of vinyl acetate and vinyl chloride, polystyrene, polycarbonate and the polymers derived from terephthalates.

The β-alanines derivatives of my invention, when used alone, have satisfactory photographic properties; they do not cause fog or loss of speed and prevent the formation of air bells. These wetting agents are especially useful in permitting coating operations at very high speeds.

The novel wetting agents of this invention may be used as a coating aid, either alone or in conjunction with any known surfactant or wetting agent; such as, the taurides, protein condensation products of fatty acids, saponin or polyoxyethylene derivatives of long-chain fatty acids and alcohols.

An especially desirable combination of wetting agents includes the use of lesser amounts of my alanine derivatives in combination with betaine derivatives which carry a long hydrocarbon chain. These betaine derivatives are characterized by the following general formula:

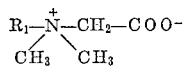

in which R represents an aliphtic hydrocarbon radical of from 8 to 20 carbon atoms. These betaine compounds are prepared by reacting a tertiary higher alkyl amine such as dodecyldimethylamine, tetradecyldimethylamine or hexadecyldiethylamine with chloroacetic acid. These compounds can also be prepared by condensing the tertiary amine with a halogenated carboxylic ester and saponifying the ester as described in United States Patent 2,082,275.

By combining the β-alanine derivatives and the long-chain betaine derivatives, it is possible to obtain even greater coating speeds; and the quality of the coatings obtained is improved in spite of the fact that the substituted betaines, when used alone or in combination with saponin, do not yield good coatings. In practicing this invention, the amounts of betaine derivatives used range from 25 to 75 percent by weight based on the amount of alanine derivative employed.

The following specific examples will illustrate the invention.

*Example I*

To a solution for the preparation of an NC layer containing 10 percent gelatin and a small amount of a dye was added .075 percent of the monosodium salt of N-dodecyl-β-amino-dipropionate. The NC layer was coated at a speed of 75 feet per minute. The coating was found to be very uniform and free of repellency spots, mottle, and streakiness.

*Example II*

To a silver halide emulsion containing gelatin as the carrier mterial was added 0.2 percent monosodium of N-dodecyl-β-aminodipropionate. The emulsion was coated at a speed of 120 feet per minute and chilled: a 4 percent gelatin solution containing 0.2 percent of the same N-dodecyl-β-aminodipropionate was coated over this chilled emulsion in the same pass and at the same web speed of 120 feet per minute. The coating was found to be very uniform and free of repellency spots, mottle and streakiness. The photographic properties were excellent, and neither fog nor loss of speed was observed.

A similar emulsion containing saponin as the sole surfactant could not be coated at a speed of more than 60 feet per minute because skipping occurred. Wet-on-wet coating proved impossible.

*Example III*

To one liter of a silver halide emulsion containing 50 grams of gelatin as the carrier material was added one gram of sodium-N-dodecyl-β-aminopropionate (sodium-N-lauryl-β-aminopropionate). This emulsion was coated at a speed of 120 feet per minute. The coating was found to be very uniform and free of repellency spots, mottle and streakiness. A sample of the film was developed in a black and white developer having the following formula:

| | |
|---|---|
| Metol _____grams__ | 1.5 |
| Sodium sulfite, anhydrous_____do____ | 45.0 |
| Sodium bisulfite_____do____ | 1.0 |
| Hydroquinone _____do____ | 3.0 |
| Sodium carbonate, monohydrated_____do____ | 6.0 |
| Potassium bromide_____do____ | .8 |
| Water to make_____liter__ | 1.0 |

The developed film was then fixed, washed and dried. It was free of air bells whereas an emulsion coated with saponin as the surfactant showed considerable air bells.

*Example IV*

A silver halide emulsion was prepared and divided into four equal parts. Different wetting agents and combinations of wetting agents were added to each part, and the parts were then coated on a cellulose acetate base. The particular wetting agents used and the results obtained are indicated in the table below:

| | Coating Quality | Freedom from Air Bells |
|---|---|---|
| A. 0.1 percent of monosodium-N-dodecyl-β-aminodipropionate and .05 percent cetylbetaine. | Excellent____ | Excellent. |
| B. 0.1 percent of monosodium-N-dodecyl-β-aminodipropionate. | _____do_____ | Good. |
| C. 0.1 percent cetylbetaine_____ | Poor_____ | Do. |
| D. 0.1 percent saponin_____ | Fair_____ | Poor. |
| E. 0.1 percent cetylbetaine and 0.1 pecent saponin. | _____do_____ | Good. |

It was observed from these experiments that the combination of sodium-N-dodecyl-β-aminoproprionate and cetylbetaine proved excellent with respect to coating quality and air bell prevention.

Cetylbetaine by itself was unsatisfactory because of its poor coating quality. Monosodium-N-dodecyl-β-aminodipropionate by itself has excellent coating qualities but showed a few isolated air bells. Saponin showed good coating properties but was very poor in air bell performance. Similar results were obtained when the above emulsions were coated on photograpic baryta paper.

Many modifications will be apparent to persons skilled in the art. Therefore, I do not intend to be limited in the patent granted except as necessitated by the appended claims.

I claim:

1. A coating solution for use in coating a photographic base comprising gelatin as the colloidal carrier material and containing as a wetting agent, a compound selected from the group consisting of the compounds having the following general formulae:

$$RNHCH_2CH_2COOX$$

and $$RN(CH_2CH_2COOX)_2$$

wherein R is an aliphatic hydrocarbon radical having from 8 to 20 carbon atoms and X is selected from the group consisting of hydrogen, an alkali metal, ammonium and an organic amine cation.

2. A coating solution according to claim 1 wherein said wetting agent is sodium-N-dodecyl-β-aminopropionate.

3. A coating solution according to claim 1 wherein said wetting agent is disodium-N-octadecyl-β-aminodipropionate.

4. A coating solution according to claim 1 wherein said wetting agent is the monosodium salt of N-lauryl-β-aminodipropionic acid.

5. A coating solution according to claim 1 wherein said wetting agent is N-hexadecyl-β-aminopropionic acid.

6. A coating solution as recited in claim 1 wherein the wetting agent is present in an amount ranging from .02 percent to 0.5 percent by weight based on the volume of the solution.

7. A coating solution as recited in claim 2 wherein the wetting agent is present in an amount ranging from 1 to 40 grams per kilogram of dry gelatin used in the preparation of the solution.

8. A liquid photographic gelatin silver halide emulsion containing a wetting agent selected from the group consisting of the compounds having the following general formulae:

$$RNHCH_2CH_2COOX$$

and $$RN(CH_2CH_2COOX)_2$$

wherein R is an aliphatic hydrocarbon radical having from 8 to 20 carbon atoms and X is selected from the group consisting of hydrogen, an alkali metal, ammonium and an organic amine cation.

9. A photographic gelatin silver halide emulsion according to claim 8 wherein said wetting agent is the monosodium salt of N-dodecyl-β-aminodipropionate.

10. A liquid photographic silver halide emulsion as recited in claim 8 wherein the amount of the wetting agent present in the emulsion is from .02 percent to 0.5 percent by weight based on the volume of the emulsion to be coated.

11. A photographic element carrying on a suitable base a layer comprising gelatin as the colloidal carrier material said layer containing a β-alanine derivative selected from the group consisting of those compounds having the following general formulae:

$$RNHCH_2CH_2COOX$$
and
$$RN(CH_2CH_2COOX)_2$$

wherein R is an aliphatic hydrocarbon radical having from 8 to 20 carbon atoms and X is selected from the group consisting of hydrogen, alkali metal, ammonium and an organic amine cation.

12. A photographic element according to claim 11 wherein said layers contain in admixture with said β-alanine derivative a long-chain betaine derivative having the following formula:

$$R_1-\overset{+}{N}-CH_2COO^-$$
$$\phantom{R_1-N-}\underset{CH_3}{\diagup}\underset{CH_3}{\diagdown}$$

wherein $R_1$ is an aliphatic hydrocarbon radical having from 8 to 20 atoms.

13. A photographic element according to claim 12 containing the monosodium salt of N-dodecyl-β-aminodipropionic acid in admixture with hexadecylbetaine.

14. A photographic element as recited in claim 12 wherein the amount of said betaine derivative ranges from 25 to 75 percent by weight based on the amount of said alanine derivative.

15. A photographic element according to claim 12 containing the monosodium salt of N-lauryl-β-aminodipropionate and cetylbetaine.

16. A photographic element as recited in claim 15 wherein the ratio of the sodium salt of N-lauryl-β-aminodipropionate and cetylbetaine is on the order of 2:1.

17. A photographic element carrying on a suitable base a silver halide emulsion layer comprising gelatin as the colloidal carrier material, said layer containing a β-alanine derivative selected from the group consisting of those compounds having the following general formulae:

$$RNHCH_2CH_2COOX$$
and
$$RN(CH_2CH_2COOX)_2$$

wherein R is an aliphatic hydrocarbon radical having from 8 to 20 carbon atoms and X is selected from the group consisting of hydrogen, alkali metal, ammonium and an organic amine cation; said layer containing a mixture with said β-alanine derivative a long-chain betaine derivative having the following formula:

$$R_1-\overset{+}{N}-CH_2COO^-$$
$$\phantom{R_1-N-}\underset{CH_3}{\diagup}\underset{CH_3}{\diagdown}$$

wherein $R_1$ is an aliphatic hydrocarbon radical having from 8 to 20 carbon atoms, wherein the amount of said betaine derivative ranges from 25 to 75 percent by weight based on the amount of said alanine derivative, and wherein the amount of said β-alanine derivative ranges from 0.1 to 5.0 milligrams per square foot of coated area.

18. A photographic element carrying on a suitable base a gelatin silver halide layer, said layer containing from 0.1 to 5 milligrams of monosodium-N-dodecyl-β-aminodipropionate per square foot of coated area and from 25 to 75 percent of cetylbetaine based on the amount of monosodium-N-dodecyl-β-aminodipropionate present in said layer.

References Cited in the file of this patent

UNITED STATES PATENTS

| | | |
|---|---|---|
| 2,082,275 | Daimler et al. | June 1, 1937 |
| 2,240,472 | Swan | Apr. 29, 1941 |
| 2,468,012 | Isbell | Apr. 19, 1949 |
| 2,993,071 | Anderson | July 18, 1961 |
| 3,038,804 | Knox et al. | June 12, 1962 |